United States Patent
Kubota et al.

(10) Patent No.: US 7,323,720 B2
(45) Date of Patent: Jan. 29, 2008

(54) LIGHT-EMITTING DEVICE, IMAGE FORMING APPARATUS, AND ELECTRONIC APPARATUS WITH AN INTEGRATED CIRCUIT MOUNTED ON A SUBSTRATE

(75) Inventors: Takehiko Kubota, Suwa (JP); Shinsuke Fujikawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 49 days.

(21) Appl. No.: 11/347,287

(22) Filed: Feb. 6, 2006

(65) Prior Publication Data

US 2006/0202638 A1   Sep. 14, 2006

(30) Foreign Application Priority Data

Mar. 14, 2005 (JP) .............................. 2005-070504

(51) Int. Cl.
*H01L 27/15* (2006.01)
*H01L 29/161* (2006.01)
*H01L 31/12* (2006.01)
*H01L 31/153* (2006.01)
*H01L 33/00* (2006.01)

(52) U.S. Cl. ............................ 257/84; 257/81; 257/83; 257/88; 257/98; 257/99; 257/291; 257/433; 257/680

(58) Field of Classification Search ............ 257/98–99, 257/433–434, 680, 81, 83, 84, 88, 291
See application file for complete search history.

(56) References Cited

U.S. PATENT DOCUMENTS

| 6,188,420 B1* | 2/2001 | Kuribayashi et al. ........ 347/132 |
| 6,586,776 B1* | 7/2003 | Liu ............................... 257/98 |
| 6,828,606 B2* | 12/2004 | Glebov ....................... 257/244 |
| 6,885,099 B2* | 4/2005 | Ogawa ........................ 257/701 |
| 6,909,054 B2* | 6/2005 | Sakamoto et al. .......... 174/260 |
| 2003/0042849 A1* | 3/2003 | Ogino ......................... 313/504 |
| 2003/0183830 A1* | 10/2003 | Yamazaki et al. ............. 257/90 |
| 2003/0183893 A1* | 10/2003 | Li ............................... 257/432 |
| 2004/0184495 A1* | 9/2004 | Kondo ........................ 372/36 |
| 2005/0062057 A1* | 3/2005 | Yamazaki et al. ............. 257/98 |

FOREIGN PATENT DOCUMENTS

JP      A 2003-271069      9/2003

* cited by examiner

*Primary Examiner*—Ida M. Soward
(74) *Attorney, Agent, or Firm*—Oliff & Berridge, PLC

(57) ABSTRACT

A light-emitting device includes a substrate having a plurality of light-emitting elements and a light emission region arranged on one surface thereof, light being emitted from one surface of the light emission region; and an integrated circuit chip that generates signals for controlling the plurality of light-emitting elements. The integrated circuit chip is connected to the substrate so as to overlap a portion of or the entire light emission region, as viewed from the other surface of the substrate.

16 Claims, 11 Drawing Sheets

LIGHT-EMITTING DEVICE, IMAGE FORMING APPARATUS, AND ELECTRONIC APPARATUS WITH AN INTEGRATED CIRCUIT MOUNTED ON A SUBSTRATE

CROSS-REFERENCE TO RELATED APPLICATIONS

The present application claims priority to Japanese Patent Application No. 2005-070504 filed on Mar. 14, 2005 in Japan, which is hereby expressly incorporated by reference herein in its entirety.

BACKGROUND

1. Technical Field

The present invention relates to a light-emitting device using light-emitting elements, to an image forming apparatus, and to an electronic apparatus.

2. Related Art

In recent years, an organic light emitting diode (hereinafter, referred to as an 'OLED element'), called an organic electroluminescent element or a light emitting polymer element, has attracted attention as a next-generation light-emitting device substituted for a liquid crystal element. A panel using the OLED elements has a low degree of viewing angle dependency since the OLED element is a self-emission type, and has low power consumption and a small thickness since it does not require a backlight or reflected light.

In general, the light-emitting device using the OLED elements includes a substrate having a plurality of OLED elements, a plurality of scanning lines, and a plurality of data lines formed thereon and semiconductor chips (hereinafter, referred to as 'ICs') for supplying scanning signals or data signals to the substrate. For example, JP-A-2003-271069 discloses a technique for separately providing, on the substrate, an IC region where ICs are arranged from a pixel region where the OLED elements are arranged (see FIG. 1). In addition, there has been known an IC mounting method in which ICs are mounted on a flexible substrate (hereinafter, referred to as 'FPC') and signals and power are supplied to the substrate via the FPC.

However, when the ICs are arranged on the substrate in the light-emitting device as in the related art, tolerance should be considered in order to mount the ICs in a region other than the IC region in a frame portion other than the pixel region, resulting in an increase in the area of the frame portion. Meanwhile, in the IC mounting method using the FPC, the ICs are arranged on the FPC, which causes an increase in the number of wiring lines for connecting the ICs to the substrate, resulting in an increase in the cost of the FPC. In addition, the IC mounting method causes an increase in the mounting width of the FPC required for connection to the substrate. Further, in order to accurately manufacture the light-emitting device, it is necessary to narrow gaps between wiring lines of the FPC, which is more difficult than to narrow gaps between mounting terminals of the ICs.

SUMMARY

An advantage of some aspects of the invention is that it provides a light-emitting device having a structure in which ICs are mounted on a substrate, which makes it possible to reduce the area of the substrate and improve the accuracy of manufacture.

According to an aspect of the invention, a light-emitting device includes a substrate having a plurality of light-emitting elements and a light emission region arranged on one surface thereof, light being emitted from one surface of the light emission region; and an integrated circuit chip that generates signals for controlling the plurality of light-emitting elements. The integrated circuit chip is connected to the substrate so as to overlap a portion of or the entire light emission region, as viewed from the other surface of the substrate.

According to this structure, the integrated circuit chip can be arranged so as to overlap a portion of or the entire light emission region, which makes it possible to reduce the area of the substrate by the overlapping area thereof, resulting in a reduction in the manufacturing cost of the light-emitting device. In addition, any types of light-emitting elements can be used. For example, OLED elements or inorganic light emitting diodes may be used.

In the above-mentioned structure, it is preferable that the light emission region be formed on the other surface of the substrate. Preferably, the integrated circuit chip includes a plurality of terminals, and the integrated circuit chip is fixed to the other surface of the substrate by the plurality of terminals. In addition, preferably, the lengths of the terminals are set such that the bottom of the integrated circuit chip does not contact the light emission region. According to this structure, when the lengths of the terminals of the integrated circuit chip is set in the above-mentioned range, the light-emitting elements do not come into contact with the bottom of the integrated circuit chip even when the light-emitting elements are formed on the substrate, and thus they are not damaged. In addition, since the integrated circuit chip is arranged on the opposite surface to the emission surface of the light emission region, the integrated circuit chip does not prevent the emission of light. In addition, it is preferable that an anisotropic conductive film be used to fix the integrated circuit chip to the substrate.

Further, in the above-mentioned structure, it is preferable that some of the plurality of terminals of the integrated circuit chip be output terminals for outputting signals to the plurality of light-emitting elements, and that each of the plurality of light-emitting elements have a cathode and an anode. In addition, preferably, the light-emitting device further includes a plurality of connection terminals that are provided on the substrate so as to be connected to the plurality of output terminals of the integrated circuit chip; a common cathode line that is connected to the cathodes of the plurality of light-emitting elements; and first wiring lines that connect the anodes of the plurality of light-emitting elements to the plurality of connection terminals. Preferably, the connection terminals are arranged opposite to the common cathode line with the light-emitting elements interposed therebetween.

According to this structure, since the light-emitting elements are interposed between the common cathode line and the connection terminals, the first wiring lines for connecting the connection terminals to the light-emitting elements do not intersect the common cathode line. As a result, it is possible to simultaneously form the common cathode line and the wiring lines for connecting the input terminals to the light-emitting elements with the same material. In addition, since the wiring lines do not intersect each other, it is possible to prevent the lowering of yield due to a short circuit between the wiring lines. Further, it is possible to reduce stray capacitance of the light-emitting elements and thus to reduce the driving load thereof.

Furthermore, in the above-mentioned structure, it is preferable that the common cathode line be arranged on one side of a column of the plurality of light-emitting elements, and that the plurality of connection terminals be arranged on the other side of the column of the plurality of light-emitting elements. According to this structure, it is possible to simplify the layout of the light-emitting device. In addition, since the first wiring lines for connecting the plurality of connection terminals to the plurality of light-emitting elements can have the same length, a uniform driving characteristic can be obtained, and a variation in brightness can be prevented.

Moreover, in the above-mentioned structure, it is preferable that the plurality of output terminals and the plurality of connection terminals be alternately disposed with respect to the arrangement of the plurality of light-emitting elements. According to this structure, the gaps between the output terminals of the integrated circuit chip can be widened, which makes it possible to prevent a short circuit between terminals and to extend a mounting margin.

Further, in the above-mentioned structure, preferably, the common cathode line is formed in zigzag so as to traverse adjacent light-emitting elements, and the common cathode line, the light-emitting elements, the first wiring lines, and the connection terminals are arranged from a long side of the integrated circuit chip to the other long side thereof. According to this structure, since the common cathode line does not intersect the first wiring lines, both the common cathode line and the first wiring lines can be formed on the substrate with the same material by the same process. In addition, a short circuit does not occur between the common cathode line and the first wiring lines, which results in high yield. Further, since stray capacitance is not generated between the first wiring lines and the common cathode line, the driving load of the light-emitting elements can be reduced. For example, when the integrated circuit chip is longitudinally arranged, one long side of the integrated circuit chip corresponds to the right side or the left side of the substrate. Therefore, the common cathode line, the light-emitting elements, the first wiring lines, and the connection terminals may be arranged from the left side to the right side of the substrate, or from the right side to the left side thereof.

Furthermore, in the above-mentioned structure, preferably, the electro-optical device further includes a plurality of the integrated circuit chips each having short sides and long sides, and some of the plurality of output terminals is arranged adjacent to one side of each of the integrated circuit chips. In addition, preferably, the connection terminals are arranged on the substrate at positions corresponding to the output terminals arranged adjacent to the one short side, and second wiring lines that connect the connection terminals arranged adjacent to the one short side and the light-emitting elements provided between an integrated circuit chip and a next integrated circuit chip are provided so as to intersect the one short side. According to this structure, the second wiring lines can be arranged adjacent to the short side of the integrated circuit chip in a region having the light-emitting elements formed therein, which makes it possible to reduce the area of the substrate.

Moreover, in the above-mentioned structure, it is preferable that the light-emitting device include a flexible substrate having a plurality of wiring lines for supplying signals from the outside to the integrated circuit chip; and a plurality of the integrated circuit chips each having short sides and long sides, in which a portion of the substrate covered with the flexible substrate is a first region, and the other portion of the substrate not covered with the flexible substrate is a second region. In addition, preferably, some or all of the plurality of output terminals are arranged adjacent to a long side of each of the integrated circuit chips, and the connection terminals are arranged on the substrate at positions corresponding to the output terminals arranged adjacent to the long sides. Further, preferably, third wiring lines that connect the connection terminals arranged adjacent to the long sides and the light-emitting elements provided between one integrated circuit chip and a next integrated circuit chip are provided in only the second region so as to intersect the long sides. According to this structure, since the common cathode line does not intersect the third wiring lines, both the common cathode line and the third wiring lines can be formed on the substrate with the same material by the same process. In addition, a short circuit does not occur between the common cathode line and the third wiring lines, which results in high yield. Further, since stray capacitance is not generated between the third wiring lines and the common cathode line, the driving load of the light-emitting elements can be reduced.

Further, in the above-mentioned structure, it is preferable that the light-emitting device include a flexible substrate having a plurality of wiring lines for supplying signals from the outside to the integrated circuit chip; and a plurality of the integrated circuit chips each having short sides and long sides, in which a portion of the substrate covered with the flexible substrate is a first region, and the other portion of the substrate not covered with the flexible substrate is a second region. In addition, preferably, some or all of the plurality of output terminals are arranged adjacent to a long side of each of the integrated circuit chips, and the connection terminals are arranged on the substrate at positions corresponding to the output terminals arranged adjacent to the long sides. Further, preferably, third wiring lines that connect the connection terminals arranged adjacent to the long sides and the light-emitting elements provided between one integrated circuit chip and a next integrated circuit chip are provided in the first and second regions so as to intersect the long sides. According to this structure, the third wiring lines can be formed in a first region where the flexible substrate overlaps the substrate, which makes it possible to narrow the frame, resulting in a reduction in the area of the substrate.

Furthermore, according to another aspect of the invention, an image forming apparatus includes photosensitive members that form images by radiation of light beams; and the light-emitting device serving as a head unit that radiates the light beams onto the photosensitive members to form the images thereon. According to this aspect, the head unit can have a simple structure, and thus the image forming apparatus can also have a simple structure, which results in a reduction in the size and weight of the image forming apparatus. This electronic apparatus includes, for example, a cellular phone, a personal computer, an information terminal apparatus, and an electronic-camera.

BRIEF DESCRIPTION OF THE DRAWINGS

The invention will be described with reference to the accompanying drawings, wherein like numbers reference like elements.

DETAILED DESCRIPTION OF EMBODIMENTS

Hereinafter, preferred embodiments of the invention will be described with reference to the accompanying drawings.

Light-emitting Device

Figure 1:
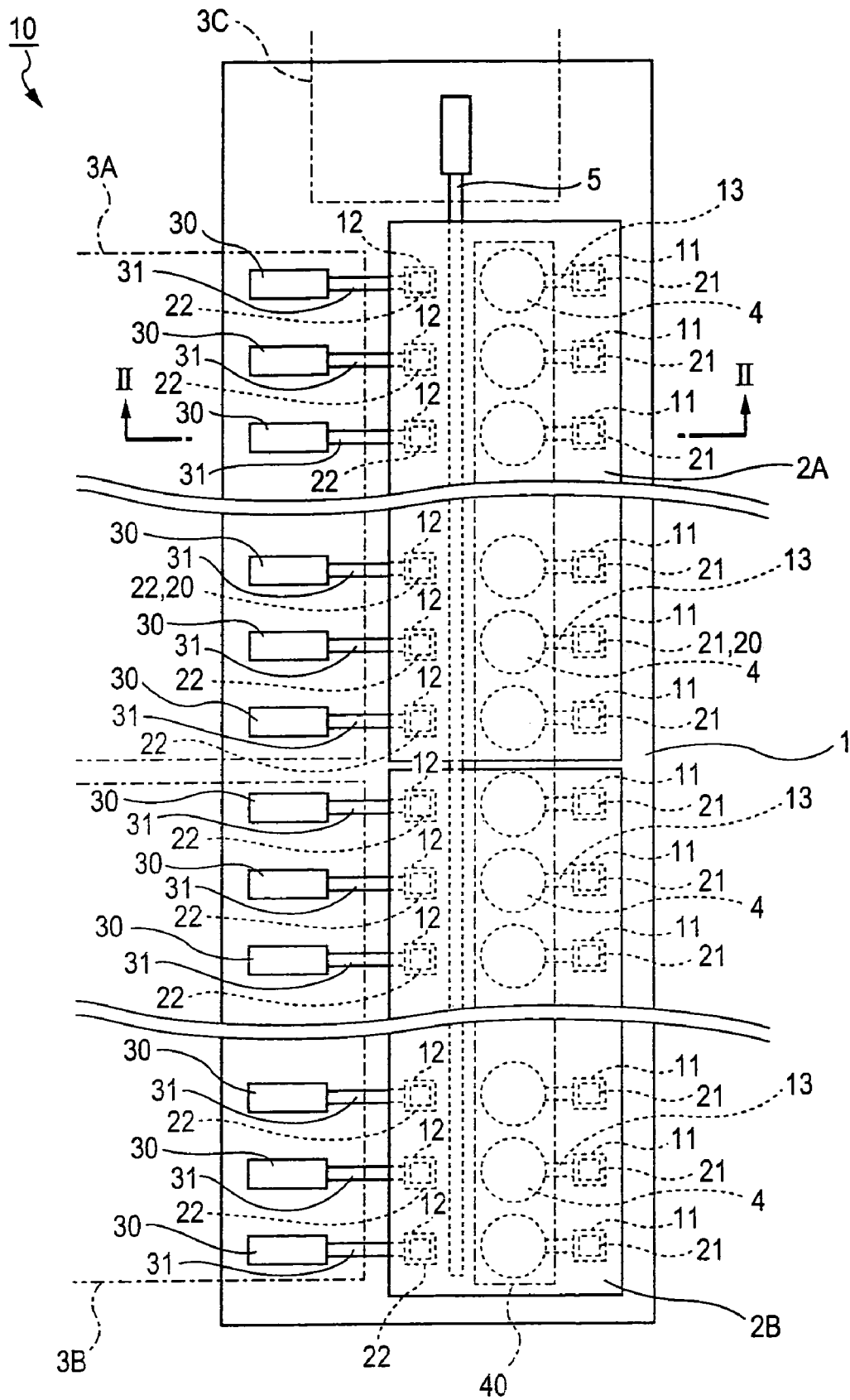
FIG. 1 is a plan view illustrating the structure of a light-emitting device according to a first embodiment of the invention.

FIG. 1 shows the structure of a light-emitting device according to an embodiment of the invention. The light-emitting device is used as a head unit 10 of a printer serving as an image forming apparatus. The head unit 10 is a linear optical head. The head unit 10 includes a substrate 1, integrated circuit chips 2A and 2B, and flexible substrates 3A, 3B, and 3C. The flexible substrates 3A and 3B supply various control signals to the integrated circuit chips 2A and 2B, respectively. The integrated circuit chips 2A and 2B are mounted on the substrate 1 by using a COG (chip on glass) technique. In this embodiment, the flexible substrates 3A, 3B, and 3C are arranged in regions (first regions) represented by one-dot chain lines, but are not arranged in the other region (second region).

The substrate 1 is formed of a transparent material transmitting light, such as glass. The substrate 1 has a light-emitting region 40 on one surface thereof, and a plurality of OLED elements 4 is formed in the light-emitting region 40. In this embodiment, the OLED elements 4 are arranged in a line along the longitudinal direction. Alternatively, the OLED elements 4 may be arranged in two columns. In addition, a gap between the integrated circuit chip 2A and the integrated circuit chip 2B is narrower than a gap between the OLED elements 4, and the OLED elements 4 are arranged at equal intervals.

Each OLED element 4 has a cathode and an anode, which will be described later. The cathodes are connected to a common cathode line 5. In addition, the integrated circuit chips 2A and 2B each have long sides and short sides, and a plurality of bumps 20 (connection terminals) are provided along the long sides. The integrated circuit chips 2A and 2B output driving signals for driving the plurality of OLED elements 4, on the basis of various control signals supplied from the outside. Therefore, the bumps 20 provided in the integrated circuit chips 2A and 2B have a plurality of output terminals 21 for outputting signals and a plurality of input terminals 22 for inputting signals.

The substrate 1 is provided with first connection terminals 11 corresponding to the output terminals 21 and second connection terminals 12 corresponding to the input terminals 22. The first connection terminals, 11 are connected to the OLED elements 4 by wiring lines 13 (first wiring lines). In this case, it is preferable that the wiring lines 13 have the same length in order for the OLED elements 4 to have uniform driving characteristics. In particular, distances between the first connection terminals 11 and the OLED elements 4 are preferably equal to each other. The resistance and stray capacitance of a wiring line 13 depend on the length of the wiring line. Therefore, when the lengths of the wiring lines are different from each other, driving currents having different waveforms are supplied to the OLED elements 4. The larger the length of the wiring line is, the smoother the wavelength becomes. As a result, a variation in emission characteristics occurs. The wiring lines having the same length makes it possible to drive the plurality of OLED elements 4 under the same condition and thus to obtain uniform emission characteristics.

Further, a plurality of third connection terminals 30 is provided in a peripheral portion of the substrate 1. The third connection terminals 30 are connected to the second connection terminals 12 through wiring lines 31. The third connection terminals 30 are connected to terminals provided on the flexible substrates 3A and 3B. In this way, signals received from an external apparatus are supplied to the OLED elements 4 through a path of the flexible substrates 3A and 3B→the third connection terminals 30→the wiring lines 31→the second connection terminals 12→the input terminals 22→the integrated circuit chips 2A and 2B→the output terminals 21→the first connection terminals 11→the wiring lines 13→the OLED elements 4. In this case, data signals, power, and control signals for controlling the integrated circuit chips 2A and 2B are supplied from the external apparatus. The integrated circuit chips 2A and 2B convert the data signals into proper current signals and then output them to the OLED elements 4. The current signals cause the OLED elements 4 to emit light. The wiring lines 31 preferably have the same length.

Figure 2:
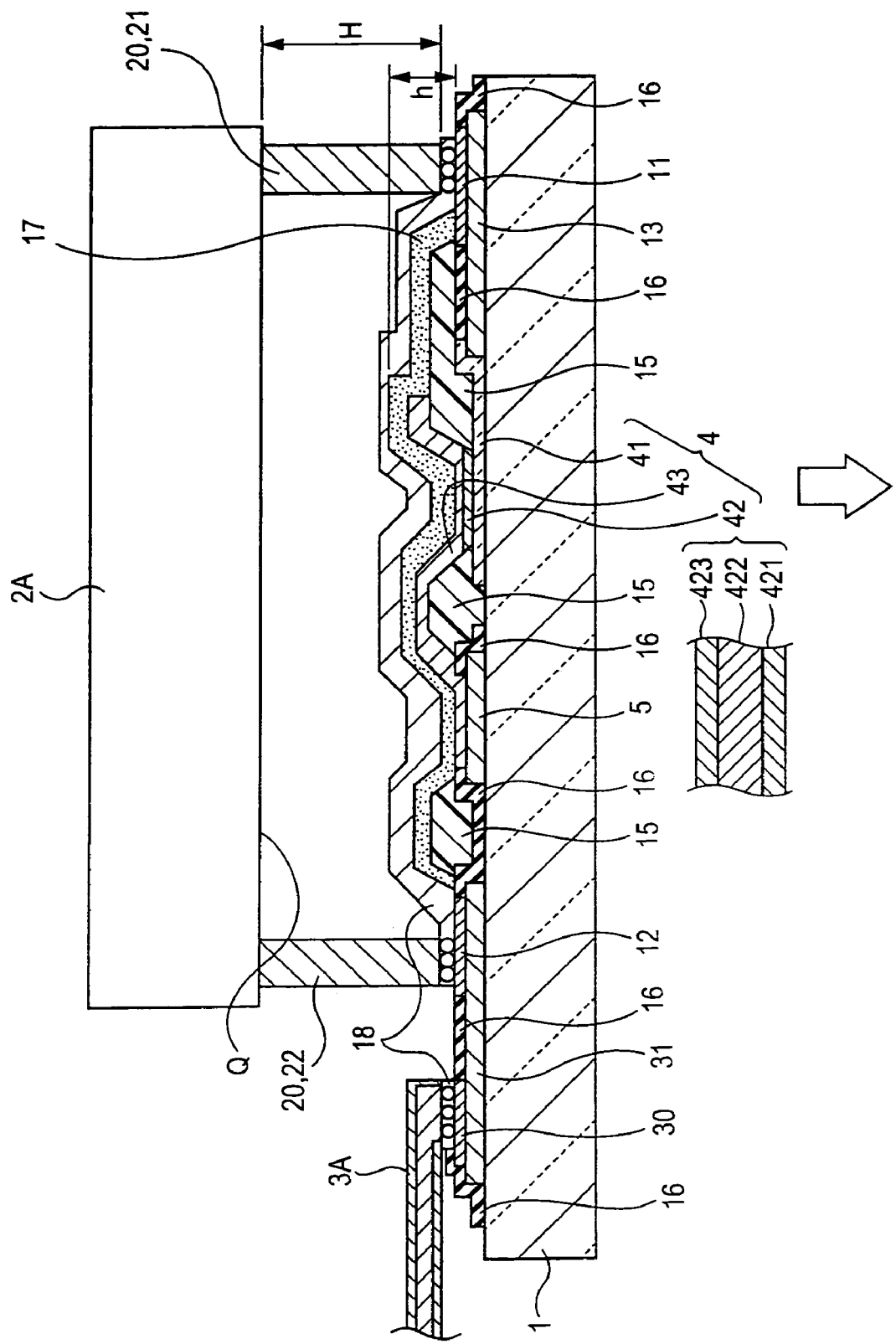
FIG. 2 is a cross-sectional view of the light-emitting device.

FIG. 2 is a cross-sectional view of the head unit 10, taken along the line II-II of FIG. 1. As shown in FIG. 2, the OLED elements 4 are formed on the substrate 1. Each OLED element 4 has an anode 41, a functional layer 42, and a cathode 43. The functional layer 42 includes a hole transporting layer 421 capable of transporting holes, a light-emitting layer 422 containing an organic EL material having a light-emitting property, and an electron transporting layer 423 provided on the light-emitting layer 422. The anode 41 is connected to the second input terminal 11 through the wiring line 13. A partition wall 15 formed of, for example, synthetic resin is provided between the cathode 43 and a portion of the surface of an insulating layer 16 where the OLED element 4 is not provided. The anode 41 has a function for supplying holes to the hole transporting layer 421, and is formed of a transparent conductive material, such as ITO (indium tin oxide) or indium oxide/zinc oxide-based amorphous transparent conductive film (indium zinc oxide: IZO (registered trademark)). The anode 41 may be formed of an alloy of the above-mentioned materials or a laminated structure thereof. The cathode 43 is formed of metal elements having a low work function (for example, alkali metal, alkaline earth metal, magnesium, rare earth elements (except Pm), and aluminum). In addition, the cathode 43 is preferably formed of a reflective or opaque conductive material. In this embodiment, light is emitted from the light-emitting layer 422 to the anode 41 (bottom emission type). The cathode 43 is connected to the common cathode line 5. It is preferable that the common cathode line 5 have a resistance value per unit area smaller than that of the cathode 43. In this way, the OLED element 4 can be driven under a low impedance condition. In addition, when the current density of the cathode 3 is low, the common cathode line 5 may not be provided. In this case, it is possible to narrow a frame and thus to reduce the area of the substrate 1.

As shown in FIG. 2, a sealing member 17 formed of, for example, a resin is provided on the cathode 43. The sealing member 17 can protect the OLED elements 4 from oxygen and water in the air. In addition, an anisotropic conductive film (ACF) 18 is provided so as to cover the sealing member 17, the first connection terminals 11, and the second connection terminals 12. The anisotropic conductive film 18 is composed of conductive particles and an adhesive made of thermosetting or ultraviolet-curable resin. The anisotropic conductive film 18 is heated or pressed at the time of bonding. In this way, the bumps 20 of the integrated circuit chip 2A and lands each composed of the first connection terminal 11 and the second connection terminal 12 are bonded to each other with the conductive particles contained in the anisotropic conductive film 18 interposed therebetween, which makes it possible to ensure good electrical connection therebetween.

In this structure, a height H of the bump 20 is set such that the anisotropic conductive film 18 does not contact a bottom Q of the integrated circuit chip 2A. More specifically, a thickness h of the sealing member 17 is smaller than the height H of the bump 20. This is similarly applied to the integrated circuit chip 2B. The height H of the bump 20 set in this way makes it possible to overlap the integrated circuit chips 2A and 2B with the light-emitting region 40 without damaging the OLED elements 4, as viewed from a direction perpendicular to the surface of the substrate 1. As a result, it is possible to reduce the area of a region where the integrated circuit chips 2A and 2B are not arranged other than the light emission region 40, and thus to reduce the area of the substrate 1.

Further, as shown in FIG. 1, since the output terminals 21 are arranged along one side of each of the integrated circuit chips 2A and 2B, the output terminals 21 are arranged on only one side of the common cathode line 5. In order words, the OLED elements 4 are arranged between the first connection terminals 11 and the common cathode line 5. In addition, the common cathode line 5 is arranged between the second connection terminals 12 and the OLED elements 4. Therefore, the wiring lines 13 for connecting the anodes 41 of the OLED elements 4 and the output terminals 21 can be formed so as not to intersect the common cathode line 5. This structure makes it possible to form the wiring lines 13 and the common cathode line 5 on the same layer and thus to simplify a manufacturing process. Since the wiring lines 13 do not intersect the common cathode line 5, a short circuit is not generated therebetween, resulting in an improvement in yield. In addition, stray capacitance due to the intersection is not generated, which results in sharp waveforms of current signals.

Furthermore, according to this embodiment, it is possible to simplify the layout of the substrate 1. The first and second connection terminals 11 and 12 can be arranged at the same pitches as those between the OLED elements 4, and the third connection terminals 30 can be arranged at equal pitches. In this way, it is possible to prevent a short circuit between adjacent third connection terminals 30 and to arrange the wiring lines of the flexible substrates 3A and 3B at equal intervals.

Second Embodiment

Figure 3:
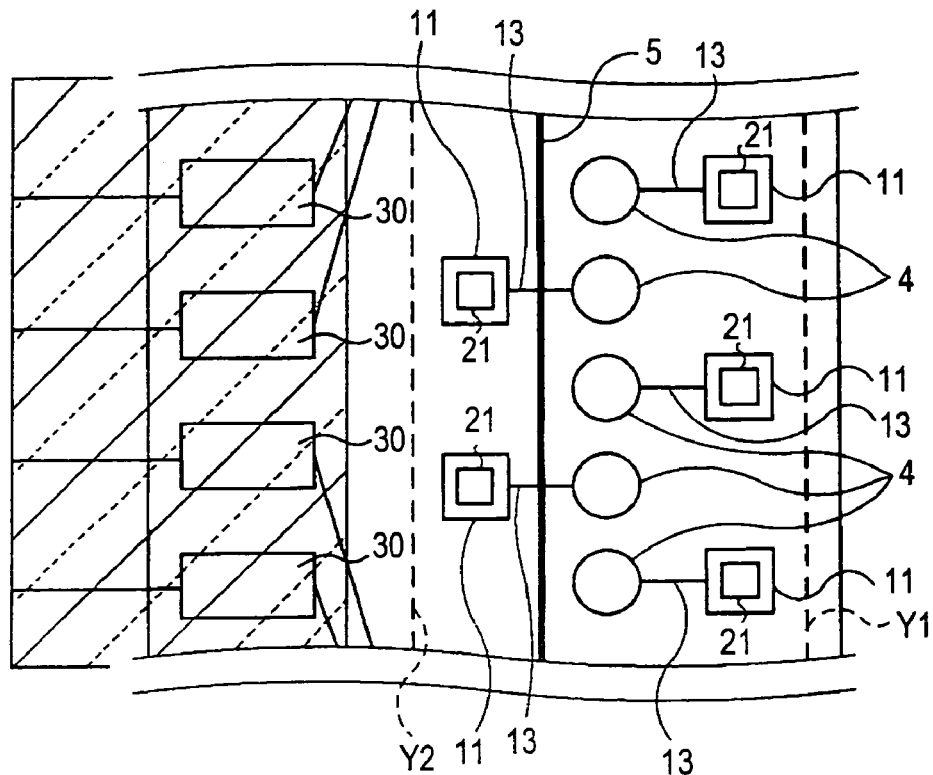
FIG. 3 is a diagram schematically illustrating the layout of a light-emitting device according to a second embodiment of the invention.

FIG. 3 is a view schematically illustrating the layout of a light-emitting device according to a second embodiment of the invention. In FIG. 3, a dotted line Y1 indicates a right end of the integrated circuit chips 2A and 2B, and a dotted line Y2 indicates a left end of the integrated circuit chips 2A and 2B. The light-emitting device according to the second embodiment differs from that in the first embodiment in the arrangement of the output terminals 21 and the first connection terminals 11 of the integrated circuit chips 2A and 2B.

In this embodiment, the output terminals 21 of the integrated circuit chips 2A and 2B are alternately arranged at the right end Y1 and the left end Y2. Accordingly, the connection terminals 11 provided on the substrate 1 are alternately arranged at the right end Y1 and the left end Y2. This arrangement of the output terminals 21 and the first connection terminals 11 allows large pitches between the bumps 20 of the integrated circuit chips 2A and 2B. As a result, it is possible to lower a possibility of adjacent mounting terminals being short-circuited and to increase a mounting margin of the integrated circuit chips 2A and 2B. The input terminals 22 are arranged in a space (not shown).

Further, the common cathode line 5 is arranged on one side of each of the OLED elements 4. However, the common cathode lines 5 may be arranged at both sides of each OLED element 4. In this way, it is possible to generate uniform stray capacitance between the common cathode lines 5 and the wiring lines 13.

Figure 4:
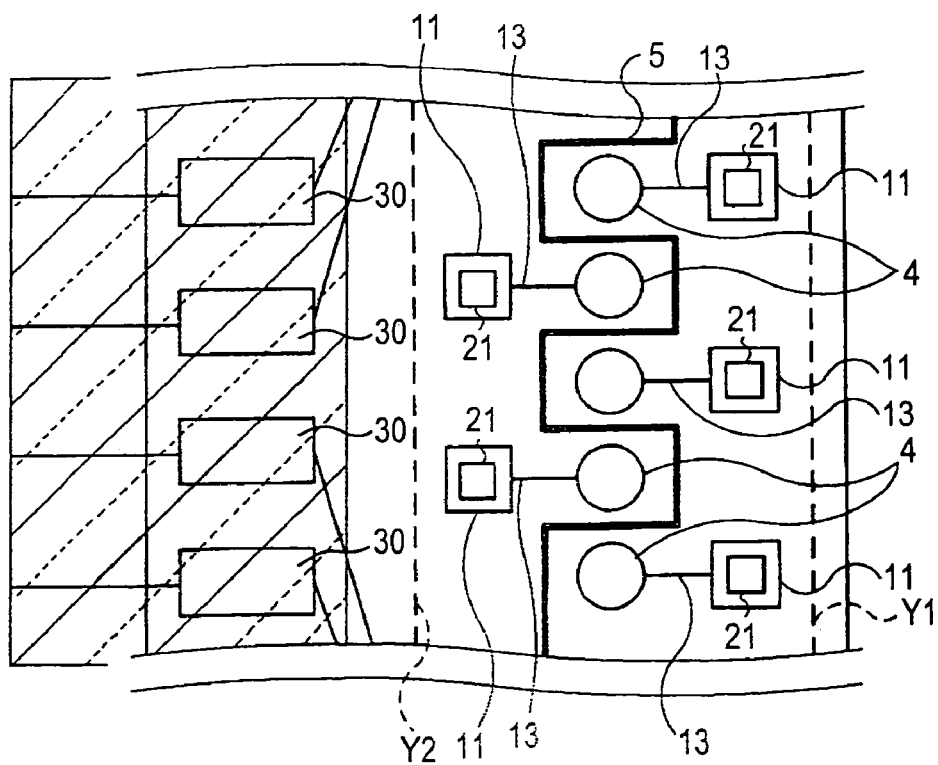
FIG. 4 is a diagram schematically illustrating the layout of a light-emitting device according to a modification of the second embodiment.

FIG. 4 is a view schematically illustrating the layout of a light-emitting device according to a modification of the second embodiment. As shown in FIG. 4, the common-cathode line 5 is arranged in zigzag so as to cross adjacent OLED elements 4. That is, the common cathode line 5 is formed so as to pass through the OLED elements 4 in a zigzag shape. In this case, since the common cathode line 5 does not intersect the wiring lines 13 for connecting the OLED elements 4 and the first connection terminals 11, the wiring lines 13 and the common cathode line 5 can be formed on the same layer, and thus the manufacturing process thereof can be simplified. In addition, since the wiring lines 13 do not intersect the common cathode line 5, a short circuit does not occur therebetween, resulting in an improvement in yield. In addition, since stray capacitance due to the intersection is not generated, odd-numbered OLED elements 4 and even-numbered OLED elements 4 can be driven under the same condition, and it is possible to make the time for which the waveforms of current signals are in high levels coincide with the time for which the waveforms of current signals are in low levels. Further, the common cathode line 5 has a light shielding property and is arranged in zigzag so as to cross adjacent OLED elements 4, which makes it possible to shield stray light emitted from the OLED elements 4. For example, a light shielding material forming the common cathode line 5 includes metallic materials, such as Ti, Mo, and Cr, oxides of these metallic materials, or laminated structures of these metallic materials and these metallic oxides.

Third Embodiment

Figure 5:
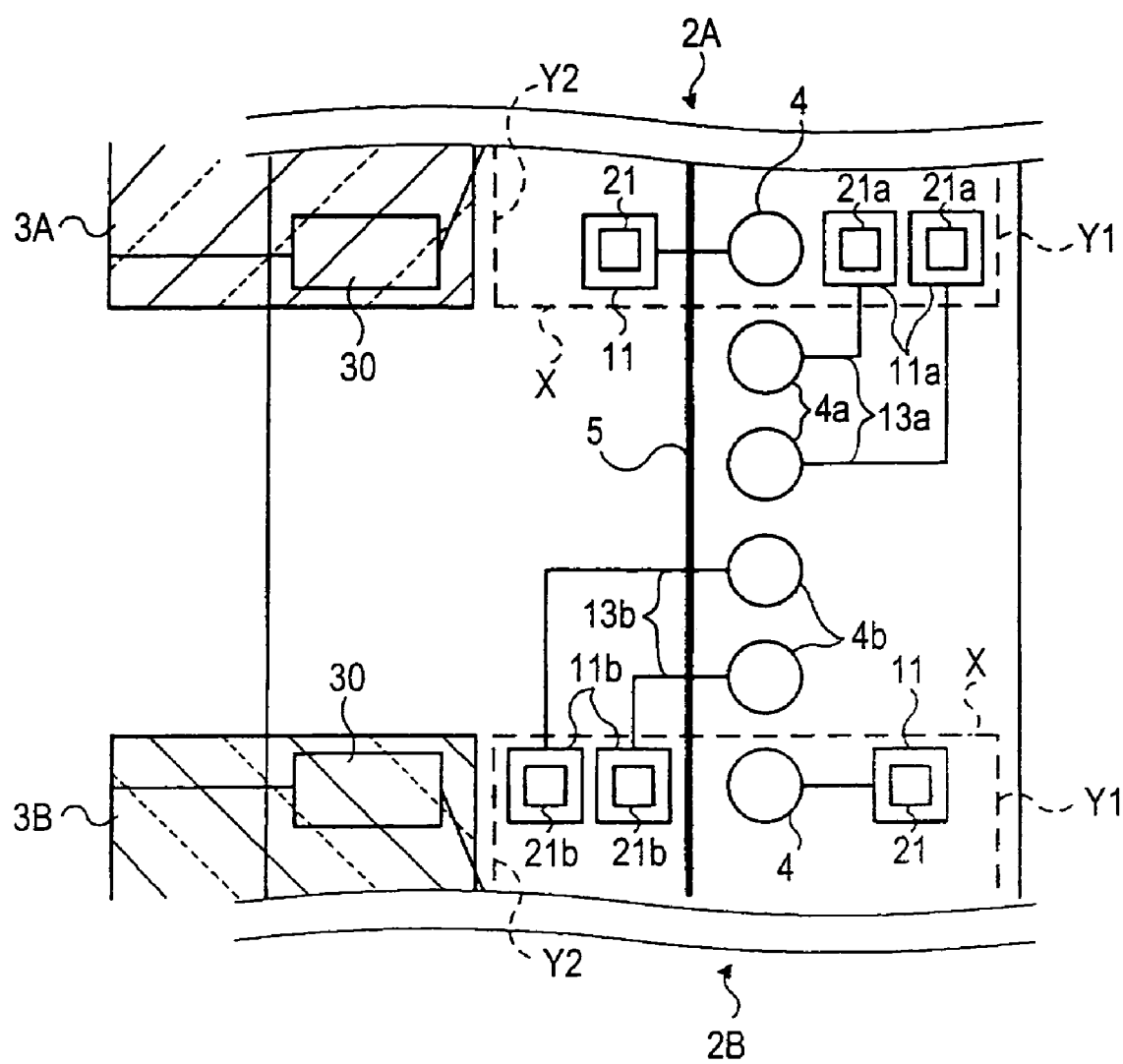
FIG. 5 is a diagram schematically illustrating the layout of a light-emitting device according to a third embodiment of the invention.

FIG. 5 is a view schematically illustrating the layout of a light-emitting device according to a third embodiment of the invention. In FIG. 5, a dotted line X indicates short sides of the integrated circuit chips 2A and 2B. The light-emitting device of the third embodiment is similar to the first and second embodiments except that OLED elements 4a and 4b are provided between the integrated circuit chips 2A and 2B and output terminals 21a and 21b and first connection terminals 11a and 11b are arranged along the short sides X of the integrated circuit chips 2A and 2B, respectively.

In this embodiment, a gap between the integrated circuit chips 2A and 2B is wider than a gap between the OLED elements, and the OLED elements 4a and 4b are provided between the integrated circuit chips 2A and 2B. The OLED elements 4, 4a, and 4b are arranged at equal intervals. The output terminals 21a arranged along a short side X of the integrated circuit chip 2A are connected to the first connection terminals 11a. Meanwhile, the output terminals 21b arranged along a short side X of the integrated circuit chip 2B are connected to the first connection terminals 11b. In addition, the OLED elements 4a and 4b are connected to the first connection terminals 11a and 11b by wiring lines 13a and 13b (second wiring lines), respectively. When the wiring lines 13a and 13b extend from a long side Y1, the area of a frame increases, and thus the substrate 1 having a large size should be used. Therefore, when the wiring lines 13a and 13b extend from the short side X as in this embodiment, the area of the substrate 1 can be reduced.

Further, in the first embodiment, the OLED elements 4 need to be arranged below the integrated circuit chips 2A and 2B, which results in an increase in the sizes of the integrated circuit chips 2A and 2B. However, in this embodiment, since the OLED elements 4a and 4b are arranged between the integrated circuit chips 2A and 2B, it is possible to reduce the sizes of the integrated circuit chips 2A and 2B. The reduction in the sizes of the integrated circuit chips 2A and 2B makes it possible to improve alignment accuracy, particularly, alignment accuracy in the rotational direction.

Figure 6:
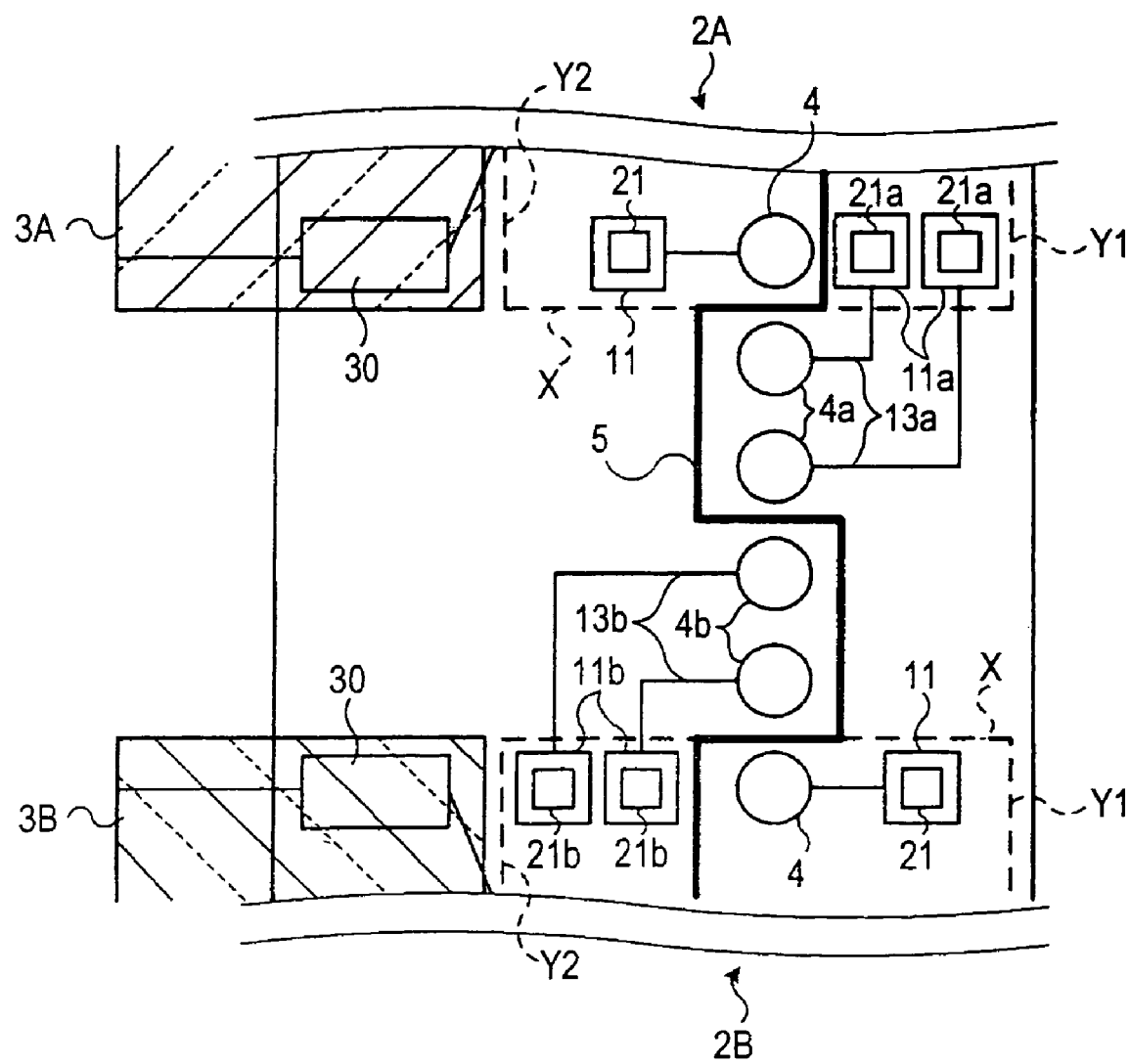
FIG. 6 is a diagram schematically illustrating the layout of a light-emitting device according to a modification of the third embodiment.

FIG. 6 is a view schematically illustrating the layout of a light-emitting device according to a modification of the third embodiment. The common cathode line 5 may pass through the OLED elements 4a and 4b in zigzag as shown in FIG. 6. In this case, since the common cathode line 5 does not intersect the wiring lines 13b for connecting the OLED elements 4b and the first connection terminals 11b, the wiring lines 13b and the common cathode line 5 can be formed on the same layer, and thus the manufacturing process thereof can be simplified. In addition, since the wiring lines 13b do not intersect the common cathode line 5, a short circuit does not occur therebetween, resulting in an improvement in yield. Further, stray capacitance due to the intersection is not generated, Which makes it possible to sharply change waveforms of current signals.

Fourth Embodiment

Figure 7:
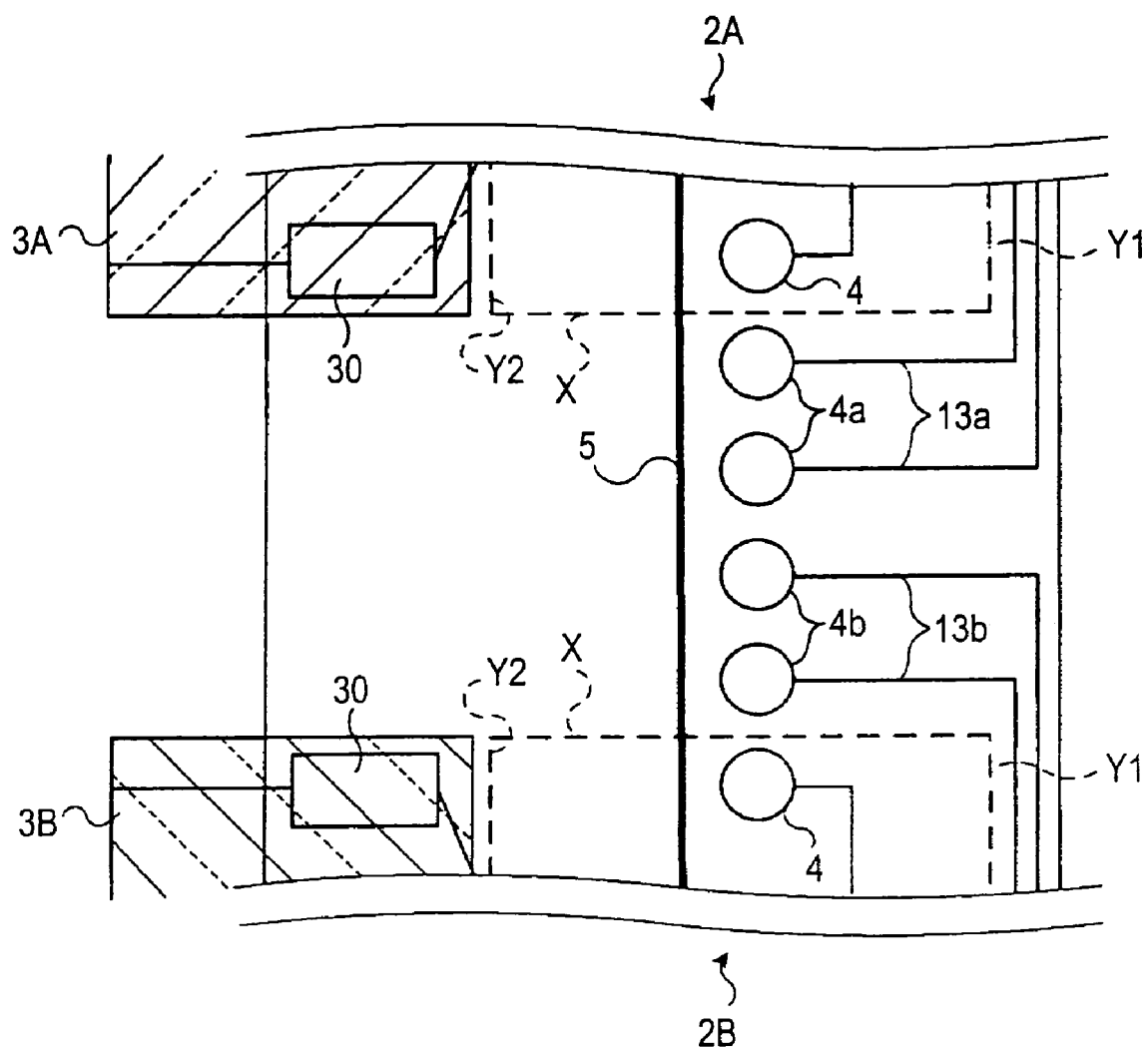
FIG. 7 is a diagram schematically illustrating the layout of a light-emitting device according to a fourth embodiment of the invention.

FIG. 7 is a view schematically illustrating the layout of a light-emitting device according to a fourth embodiment of the invention. The light-emitting device of the fourth embodiment is similar to that of the third embodiment except the arrangement of wiring lines 13a and 13b.

In this embodiment, a plurality of first connection terminals 21 (not shown) is arranged along a long side Y1, and the wiring lines 13a and 13b (third wiring lines) are arranged in a region outside the long side Y1. Therefore, similar to the layout of the third embodiment shown in FIG. 5, the common cathode line 5 does not intersect the wiring lines 13b. As a result, the wiring lines 13b and the common cathode line 5 can be formed on the same layer, and thus the manufacturing process thereof can be simplified. In addition, since the wiring lines 13b do not intersect the common cathode line 5, a short circuit does not occur therebetween, resulting in an improvement in yield. Further, stray capacitance due to the intersection is not generated, which makes it possible to sharply change waveforms of current signals.

Figure 8A:
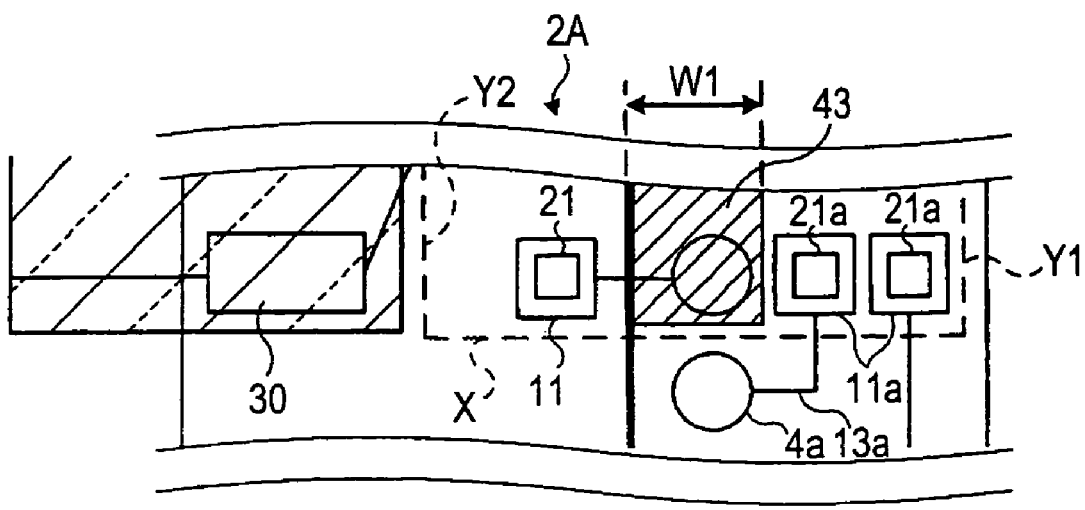
FIGS. 8A and 8B are diagrams illustrating the structure of a cathode of the light-emitting device.
Figure 8B:
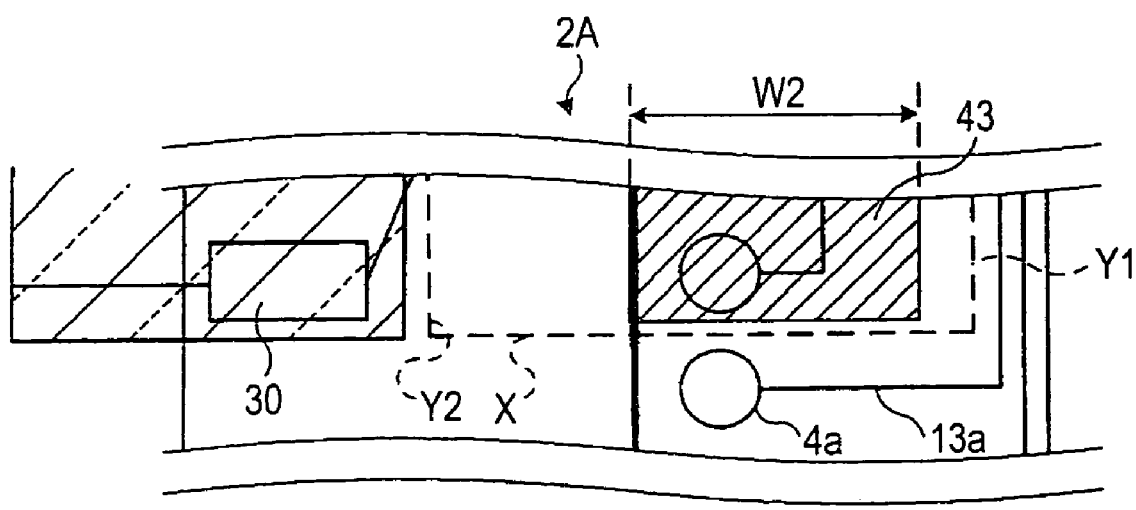

Further, the width of the cathode 43 can increase to reduce power impedance. That will be described with reference to FIGS. 8A and 8B. As shown in FIG. 8A, when the first connection terminals 11a are arranged along the short side X, it is difficult to arrange the cathode 43 above the first connection terminals 11a since the first connection terminals 11a are connected to the output terminals 21a. In contrast, when the first connection terminals 11a are not arranged along the short side X, it is possible to increase a width W2 of the cathode 43, as shown in FIG. 8B.

Fifth Embodiment

Figure 9:
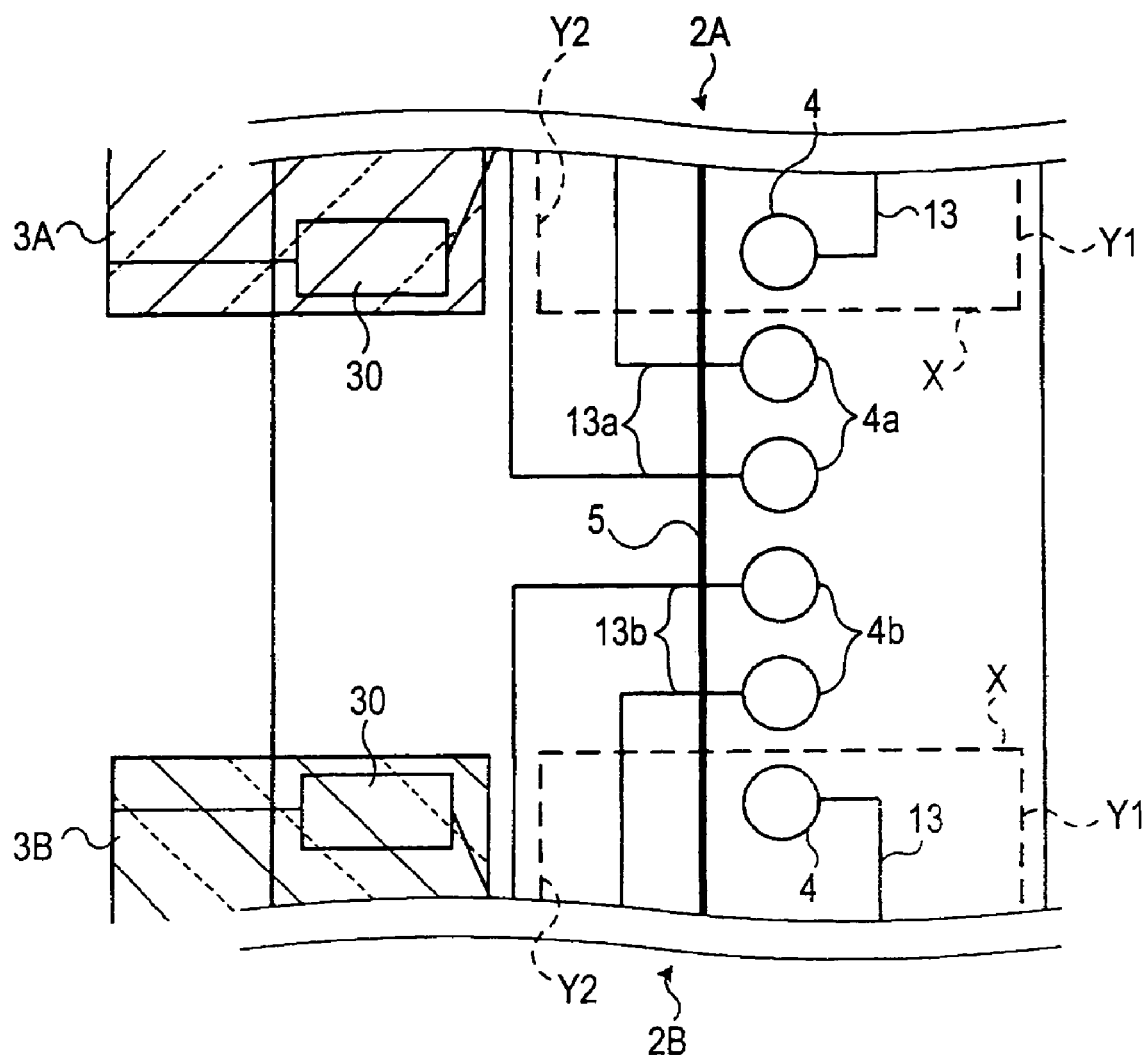
FIG. 9 is a diagram schematically illustrating the layout of a light-emitting device according to a fifth embodiment of the invention.

FIG. 9 is a view schematically illustrating the layout of a light-emitting device according to a fifth embodiment of the invention. The light-emitting device of the fifth embodiment is similar to that of the third embodiment except the arrangement of wiring lines 13a and 13b.

In this embodiment, portions of the wiring lines 13a and 13b (third wiring lines) are arranged in spaces between the flexible substrates 3A and 3B and long sides Y2, respectively. That is, the wiring lines 13a and 13b (third wiring lines) are formed in a second region other than the flexible substrates 3A, 3B, and 3C. This structure makes it possible to reduce the area of a frame and to thus reduce the size of the substrate 1.

Sixth Embodiment

Figure 10:
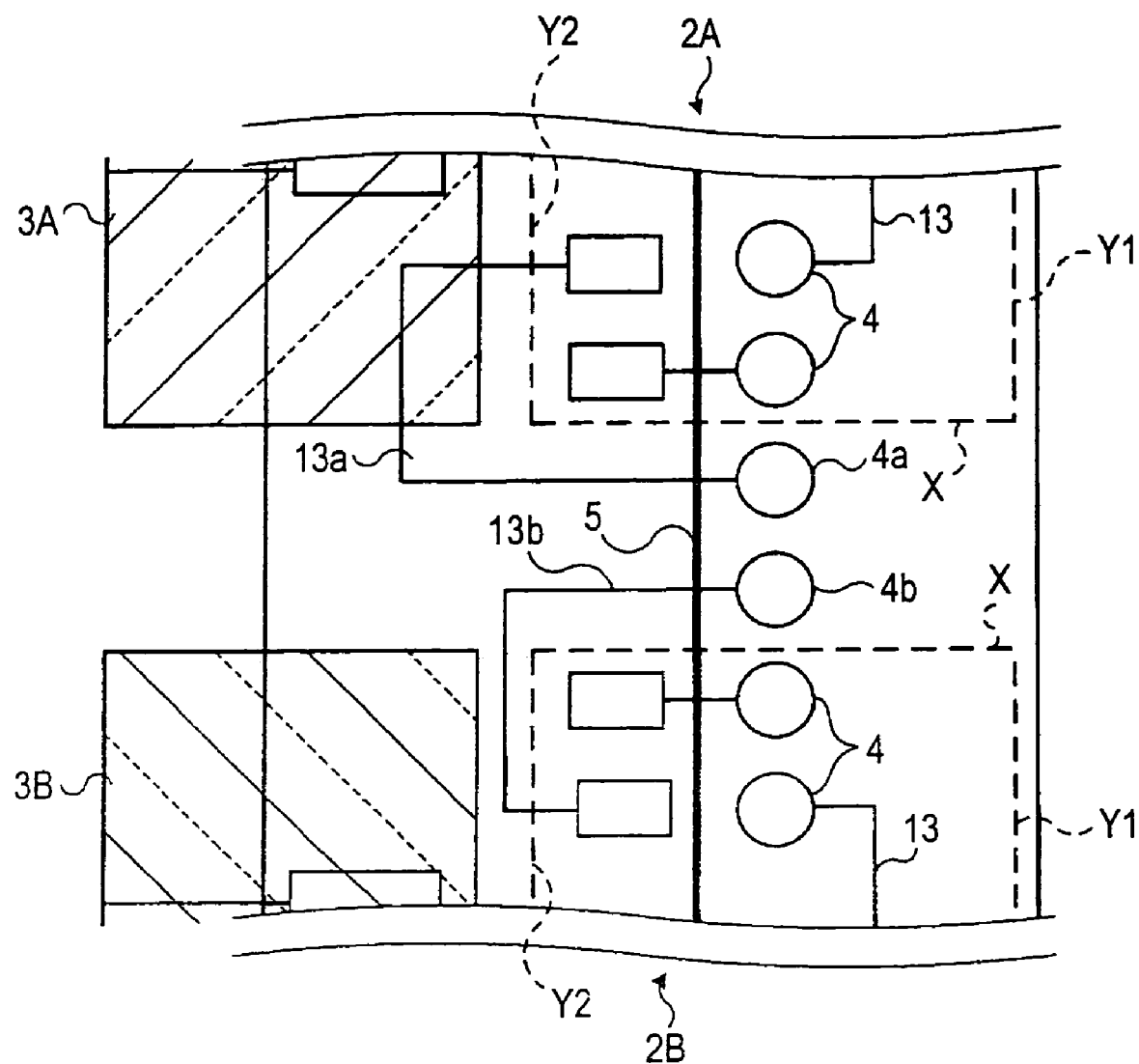
FIG. 10 is a diagram schematically illustrating the layout of a light-emitting device according to a sixth embodiment of the invention.

FIG. 10 is a view schematically illustrating the layout of a light-emitting device according to a sixth embodiment of the invention. The light-emitting device of the sixth embodiment has the same structure as that of the fifth embodiment except the arrangement of wiring lines 13a and 13b.

In this embodiment, portions of the wiring lines 13a and 13b (third wiring lines) are arranged in spaces below the flexible substrates 3A and 3B, respectively. That is, the wiring lines 13a and 13b (third wiring lines) are formed in both the first region including the flexible substrates 3A, 3B, and 3C and a second region other than the first region. The use of the second region in wiring makes it possible to reduce the area of a frame and to thus reduce the size of the substrate 1.

Image Forming Apparatus

Figure 11:
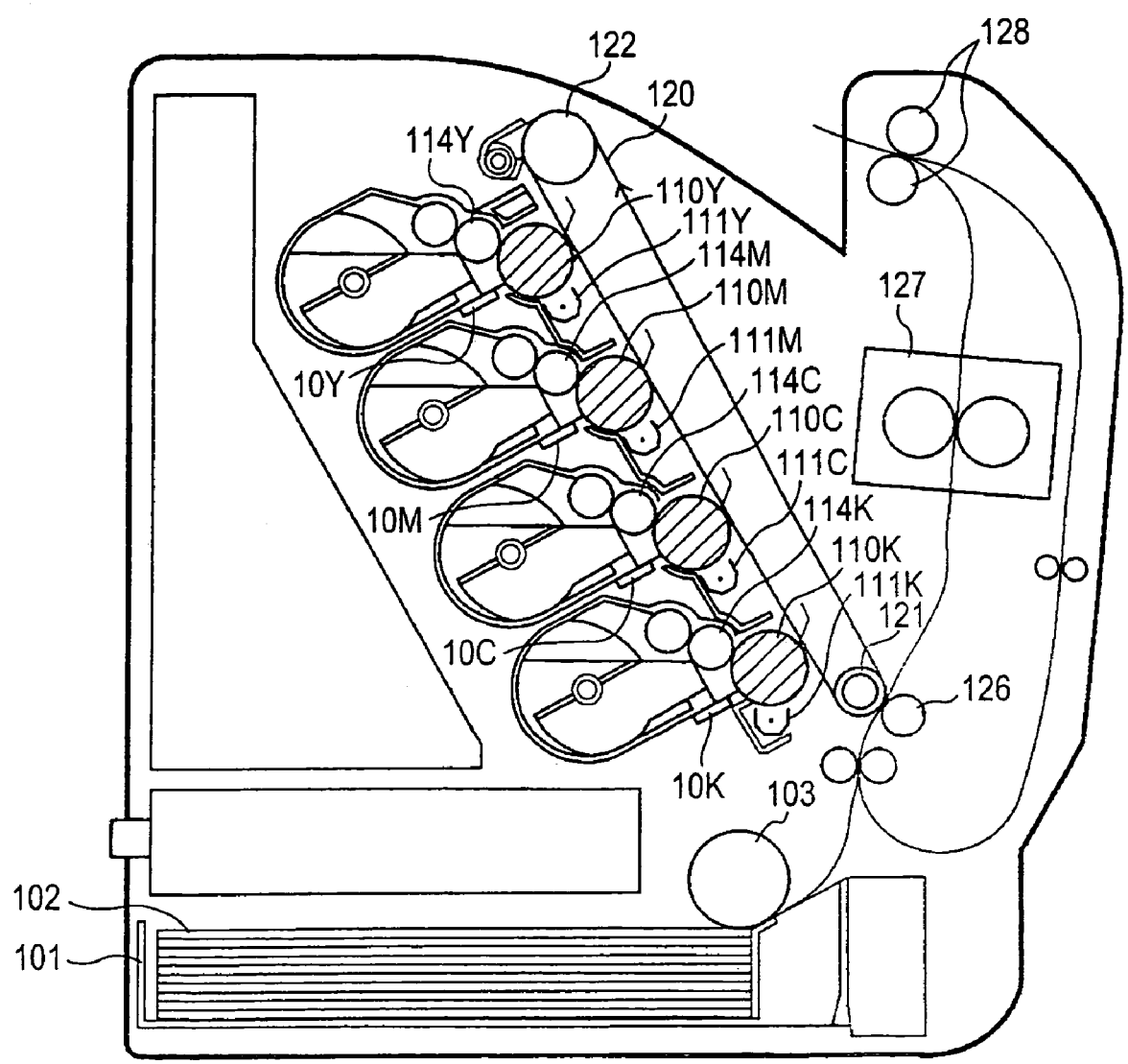
FIG. 11 is a cross-sectional view illustrating an example of an image forming apparatus.

FIG. 11 is a longitudinal cross-sectional view illustrating an example of an image forming apparatus using the head unit 10. The image forming apparatus of a tandem type, and has four organic EL array exposure heads 10K, 10C, 10M, and 10Y having the same structure are arranged at exposure positions of four photoreceptor drums (image carriers) 110K, 110C, 110M, and 110Y having the same structure. Each of the organic EL array exposure heads 10K, 10C, 10M, and 10Y is composed of the above-mentioned head unit 10.

As shown in FIG. 11, the image forming apparatus has a driving roller 121, a driven roller 122, and an intermediate transfer belt 120 circularly driven in the direction of arrow shown in FIG. 11. The four photoreceptor drums 110K, 110C, 110M, and 110Y are disposed at predetermined intervals around the intermediate transfer belt 120. Each photoreceptor drum has a photosensitive layer on the outer peripheral surface thereof. Suffixes 'K', 'C', 'M', and 'Y' added to reference numerals mean black, cyan, magenta, and yellow, respectively, and indicate black, cyan, magenta, and yellow photoreceptor drums. This is similarly applied to other members. The photoreceptor drums 110K, 110C, 110M, and 110Y are rotated in synchronism with the driving of the intermediate transfer belt 120.

A charging device (corona charger) 111 (K, C, M, and Y) and the organic EL array exposure head 10 (K, C, M, and Y) are arranged around each photoreceptor drum 110 (K, C, M, and Y). The charging device 111 (K, C, M, and Y) uniformly charges the outer peripheral surface of the corresponding photoreceptor drum 110 (K, C, M, and Y), and the organic EL array exposure head 10 (K, C, M, and Y) sequentially line-scans the outer peripheral surface uniformly charged by the charging device 111 (K, C, M, and Y) in synchronism with the rotation of the photoreceptor drum 110 (K, C, M, and Y).

The image forming apparatus is further provided with a developing device 114 (K, C, M, and Y) applying toner as a developer onto an electrostatic latent image formed by the organic EL array exposure head 10 (K, C, M, and Y) to form a visible image (toner image).

Each organic EL array exposure head 10 (K, C, M, and Y) is arranged in such a manner that the organic EL array exposure head 10 (K, C, M, and Y) is arranged along a bus of the photoreceptor drum 110 (K, C, M, and Y). The peak wavelength of emission energy of each organic EL array exposure head 10 (K, C, M, and Y) is set to be substantially equal to the peak wavelength of sensitivity of the photoreceptor drum 110 (K, C, M, and Y).

The developing device 114 (K, C, M, and Y) uses, for example, a non-magnetic single-component toner as a developing agent. In the developing process, the single-component developing agent is transferred to a developing roller by a supply roller, and the thickness of the developing agent attached to the surface of the developing roller is regulated by a regulating blade. Then, the developing roller comes into contact with or is pressed against the photoreceptor drum 110 (K, C, M, and Y) to allow the developing agent according to the voltage level of the photoreceptor drum 110 (K, C, M, and Y) to be attached to the surface of the photoreceptor drum. In this way, a toner image is developed.

Black, cyan, magenta, and yellow toner images formed by four color toner image forming station are sequentially primary-transferred onto the intermediate transfer belt 120 so as to overlap each other on the intermediate transfer belt 120, thereby forming a full color image. Recording media 102 fed one by one from a sheet feed cassette 101 by a pick-up roller 103 is transferred to a secondary transfer roller 126. The toner image on the intermediate transfer belt 120 is secondary-transferred onto the recording medium 102, such as a sheet, by the secondary transfer roller 126 and is then fixed onto the recording media 102 by a fixing roller 127 serving as a fixing unit. Then, the recording medium 102 is discharged to a sheet discharge tray formed on the upper part of the apparatus by a pair of sheet discharge rollers 128.

As such, the image forming apparatus shown in FIG. 11 used the organic EL array as a wiring unit. Therefore, even when a laser scanning optical system is used, it is possible to achieve a reduction in the size of an image forming apparatus.

Figure 12:
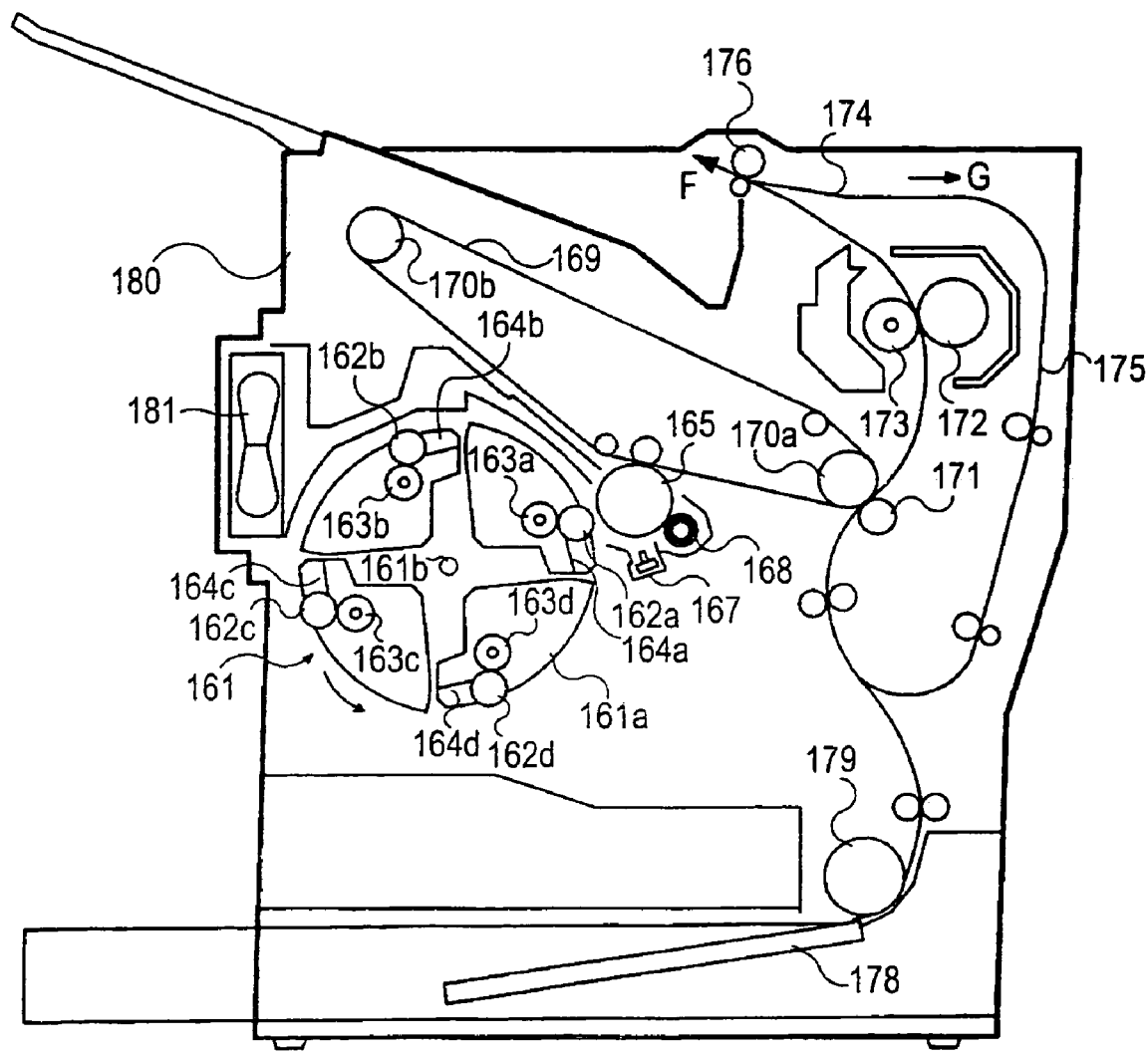
FIG. 12 is a cross-sectional view illustrating another example of the image forming apparatus.

Next, another embodiment of the image forming apparatus according to the invention will be described. FIG. 12 is a longitudinal sectional view illustrating the image forming apparatus. In FIG. 12, the image forming device includes, as main components, a developing device 161 having a rotary structure, a photoreceptor drum 165 serving as an image carrier, an exposure head 167 provided with an organic EL array, an intermediate transfer belt 169, a sheet transport path 174, a heating roller 172 as a fixer, and a sheet feed tray 178. The exposure head 167 is formed of the above-mentioned head unit 10.

In the developing device 161, a developing rotary 161a rotates in the counterclockwise direction around a shaft 161b. The inside of the developing rotary 161a is divided into four divisions in which units for forming four yellow (Y), cyan (C), magenta (M), and black (K) images are provided, respectively. Developing rollers 162a to 162d toner supply rollers 163a to 163d are arranged in the four color image forming units, respectively. Regulating blades 164a to 164d regulate the toners at a predetermined thickness.

The photoreceptor drum 165 is charged by the charging device 168, and is driven in a direction opposite to the rotational direction of the developing roller 162a by a driving motor (not shown) such as a stepping motor. The intermediate transfer belt 169 is stretched between a driven roller 170b and a driving roller 170a, and the driving roller 170a is connected to the driving motor of the photoreceptor drum 165, such that power is supplied to the intermediate transfer belt. The driving of the driving motor causes the driving roller 170a of the intermediate transfer belt 169 to rotate in a direction opposite to the rotational direction of the photoreceptor drum 165.

A plurality of transporting rollers and a pair of sheet discharging rollers 176 are provided in a sheet transport path 174 for transporting sheets. A single-side image (toner image) carried on the intermediate transfer belt 169 is transferred onto one surface of a sheet at the position of the secondary transfer roller 171. The secondary transfer roller 171 comes into contact with or is separated from the intermediate transfer belt 169 by a clutch. When the clutch is turned on, the secondary transfer roller 171 comes into contact with the intermediate transfer belt 169 such that the image is transferred onto the sheet.

Then, a fixing process is performed on the sheet having the image transferred thereon by the fixer having a fixing heater. The fixer is provided with a heating roller 172 and a pressing roller 173. After the fixing process, the sheet is transferred in a direction of arrow F by the pair of discharging rollers 176. In this state, when the discharging rollers 176 rotate in the opposite direction, the sheet passes through a double-sided printing transport path 175 in a direction of arrow G. The sheets are discharged one by one from the sheet feed tray 178 by the pick-up roller 179.

In the sheet transport path, for example, a low-speed brushless motor is used as the driving motor for driving a transport roller. Further, since the intermediate transfer belt 169 requires, for example, the correction of color irregularity, a stepping motor is used. These motors are controlled by control signals from a control unit (not shown).

In the state shown in FIG. 11, a yellow (Y) electrostatic latent image is formed on the photoreceptor drum 165, and a high voltage is applied to the developing roller 168, such that a yellow image is formed on the photoreceptor drum 165. When the yellow images on the rear and front surfaces are carried on the intermediate transfer belt 169, the developing rotary 161a rotates by an angle of 90 degrees.

The intermediate transfer belt 169 makes one revolution to return to the position of the photoreceptor drum 165. Then, the double-sided cyan (C) images are formed on the photoreceptor drum 165, and the images overlap the yellow image carried on the intermediate transfer belt 169 and are then carried thereon. Similarly, the rotation of the developing rotary 161 by 90 degrees and one revolution of the intermediate transfer belt 169 having the image carried thereon are repeatedly performed.

In order to carry four color images, the intermediate transfer belt 169 makes four revolutions, and then the rotational position thereof is controlled, so that the image is transferred onto the sheet at the position of the secondary transfer roller 171. The sheet fed from the sheet feed tray 178 is transported along the sheet transport path 174, and then the color image is transferred onto one surface of the sheet at the position of the secondary transfer roller 171. The sheet having an image transferred on one surface thereof is reversed by the pair of discharge rollers 176, and is kept in the transport path. Thereafter, the sheet is transported to the position of the secondary transfer roller 171 at a predetermined timing, and then the color image is transferred onto the other surface of the sheet. A housing 180 is provided with an exhaust fan 181.

In the above-mentioned embodiment, the head unit 10 used for the image forming apparatus is used as an example of a light-emitting device, but the invention is not limited thereto. That is, any structures may be used as long as the integrated circuit chips 2A and 2B for driving light-emitting devices, such as the OLED elements 4, are arranged so as to overlap the light emission region 40. For example, a display device having a plurality of OLED elements arranged in a matrix is also included in the light-emitting device. In this case, a plurality of data lines and a plurality of scanning lines are formed on the substrate 1 so as to intersect each other, and a plurality of pixel circuits are formed so as to correspond to intersections of the data lines and the scanning lines. Each pixel circuit includes an OLED element and a transistor for driving the OLED element. In this structure, the light emission region is a region where the plurality of pixel circuits is arranged. A scanning line driving circuit for driving the scanning lines or a data line driving circuit for driving the data line can be incorporated into the integrated circuit chip. In this case, a portion of or the entire light emission region can be arranged so as to overlap the integrated circuit chips, which results in a reduction in the area of a substrate.

This display device can be applied to various electronic apparatuses, such as a cellular phone, a personal computer, a portable information terminal, a digital still camera, a television monitor, a view-finder-type/monitor-direct-viewing-type videotape recorder, a car navigation apparatus, a pager, an electronic organizer, an electronic calculator, a word processor, a workstation, a television phone, a POS terminal, and apparatuses equipped with touch panels. The display device can be used as display units of these electronic apparatuses.

What is claimed is:

1. A light-emitting device, comprising:
   a substrate having a first surface and a second surface;
   a light emission region arranged over the first surface of the substrate,
   a plurality of light-emitting elements each having a cathode and an anode and being located in the light emission region, light being emitted in a light-emitting direction from the light emission region;
   at least one integrated circuit chip that generates signals to control the plurality of light-emitting elements and that have a plurality of output terminals to output signals to the plurality of light-emitting elements,
   a plurality of connection terminals connected to the plurality of output terminals of the integrated circuit chip;
   a common cathode line connected to the cathode of each of the plurality of light-emitting elements; and
   first wiring lines that connect the anodes of the plurality of light-emitting elements to the plurality of connection terminals,
   the integrated circuit chip being connected to the substrate so as to overlap at least a portion of the light emission region, as viewed from a position in the light-emitting direction,
   the integrated circuit chip being fixed to the first surface of the substrate by the plurality of output terminals,
   each of the plurality of terminals having a length such that the bottom of the integrated circuit chip does not contact the light-emitting region, and
   the plurality of light-emitting elements being interposed between the plurality of connection terminals and the common cathode line.

2. The light-emitting device according to claim 1, the plurality of connection terminals being provided over the substrate.

3. The light-emitting device according to claim 1, the plurality of light-emitting elements being arranged in a column, the common cathode line being arranged adjacent a first side of the column of the plurality of light-emitting elements, and
the plurality of connection terminals being arranged adjacent a second side of the column of the plurality of light-emitting elements.

4. The light-emitting device according to claim 1, a plurality of the output terminals and the plurality of connection terminals being alternately disposed with respect to the plurality of light-emitting elements.

5. The light-emitting device according to claim 4, the common cathode line being formed to zigzag so as to traverse adjacent light-emitting elements, and
the common cathode line, the plurality of light-emitting elements, the first wiring lines, and the plurality of connection terminals being arranged from a first long side of the integrated circuit chip to a second long side of the integrated circuit chip.

6. The light-emitting device according to claim 1, the at least one integrated circuit chip being a plurality of integrated circuit chips each having short sides and long sides,
some of the plurality of output terminals being arranged adjacent to one of the short sides and long sides of each of the plurality of integrated circuit chips,
the plurality of connection terminals being arranged over the substrate at positions corresponding to the output terminals arranged adjacent to the one sides,
the light-emitting device further comprising second wiring lines that connect the connection terminals arranged adjacent to the one sides, and
at least one of the light-emitting elements being disposed between adjacent integrated circuit chips and being arranged so as to intersect the one sides.

7. The light-emitting device according to claim 1, the at least one integrated circuit chip being a plurality of integrated circuit chips each having short sides and long sides, at least some of the light-emitting elements being disposed between adjacent integrated circuit chips, the light-emitting device further comprising at least one flexible substrate having a plurality of wiring lines to supply signals to at least one of the integrated circuit chips, a first portion of the substrate being covered with the flexible substrate constituting a first region, and a second portion of the substrate not being covered with the flexible substrate constituting a second region, at least some of the plurality of output terminals being arranged adjacent to a long side of each of the plurality of integrated circuit chips, the plurality of connection terminals being arranged over the substrate at positions corresponding to the plurality of output terminals arranged adjacent to the long sides, and the light-emitting device further comprising third wiring lines that connect the plurality of connection terminals arranged adjacent to the long sides with the light-emitting elements disposed between adjacent integrated circuit chips, the third wiring lines being arranged in at least one of the first region and the second region so as to intersect the long sides.

8. The light-emitting device according to claim 7, the third wiring lines being provided in only the second region so as to intersect the long sides.

9. The light-emitting device according to claim 7, the common cathode line, the light-emitting elements provided between the adjacent integrated circuit chips, and the third wiring lines being arranged in this order.

10. The light-emitting device according to claim 7, the third wiring lines being provided in the first and second regions so as to intersect the long sides.

11. An image forming apparatus, comprising:
the light-emitting device according to claim 1; and
photosensitive members that form images by radiation of light beams,
the light-emitting device being a head unit that radiates the light beams onto the photosensitive members.

12. An electronic apparatus, comprising:
the light-emitting device according to claim 1.

13. The light-emitting device according to claim 1, the integrated circuit chip being indirectly connected to the substrate.

14. A light-emitting device, comprising:
a substrate;
a plurality of light-emitting elements arranged over the substrate, the plurality of light-emitting elements each having a cathode and an anode;
a common cathode line connecting the cathode of each of at least one pair of adjacent light-emitting elements;
at least one integrated circuit chip arranged over the plurality of light-emitting elements, the integrated circuit chip having a plurality of output terminals;
a plurality of connection terminals connected to the plurality of output terminals of the integrated circuit chip; and
wiring lines that connect the anodes of the plurality of light-emitting elements to the plurality of connection terminals, the wiring lines and the common cathode line being formed in a same layer over the substrate.

15. A light-emitting device, comprising:
a substrate;
a plurality of light-emitting elements arranged over the substrate, the plurality of light-emitting elements each having a cathode and an anode;
a common cathode line connecting the cathode of each of at least one pair of adjacent light-emitting elements;
at least one integrated circuit chip arranged over the plurality of light-emitting elements, the integrated circuit chip having a plurality of output terminals;
a plurality of connection terminals connected to the plurality of the output terminals of the integrated circuit chip; and
wiring lines that connect the anodes of the plurality of light-emitting elements to the plurality of the connection terminals,
each of the plurality of light-emitting elements being interposed between one of the plurality of connection terminals and the common cathode line.

16. A light-emitting device, comprising:
a substrate;
a plurality of light-emitting elements arranged over the substrate, the plurality of light-emitting elements each having a cathode and an anode;
a common cathode line connecting the cathode of each of at least one pair of adjacent light-emitting elements;
a plurality of integrated circuit chips each having short sides and long sides and being arranged over the plurality of light-emitting elements, the integrated circuit chip having a plurality of output terminals;
a plurality of connection terminals connected to the plurality of the output terminals of the integrated circuit chip and being arranged over the substrate; and
a wiring line,
the plurality of output terminals including a first output terminal and a second output terminal, the first output terminal being arranged adjacent to one of the short sides of the each of the plurality of integrated circuit chips and the second output terminal being arranged adjacent to one of the long sides of the each of the plurality of integrated circuit chips,
the plurality of connection terminals including a first connection terminal,
the first connection terminal connecting to the first output terminal of the integrated circuit chip,
the wiring connecting the first connection terminal to one of the plurality of light-emitting elements, and
the wiring being arranged so as to intersect the one of the short sides.

* * * * *